SYSTEM FOR TRANSFER OF DIGITAL DATA BETWEEN A MOVABLE STORAGE MEDIUM AND STATIONARY STORAGE FACILITIES

Filed Dec. 21, 1967 3 Sheets-Sheet 1

INVENTOR:
Reaman Paul Niquette
By Smyth, Roston & Pavitt
ATTORNEYS

INVENTOR:
Redman Paul Niquette
By Smyth, Roston & Pavitt
ATTORNEYS

INVENTOR:
Reamon Paul Niquette
By Smyth, Roston & Pavitt
ATTORNEYS

United States Patent Office 3,566,382
Patented Feb. 23, 1971

3,566,382

SYSTEM FOR TRANSFER OF DIGITAL DATA BETWEEN A MOVABLE STORAGE MEDIUM AND STATIONARY STORAGE FACILITIES

Reaman P. Niquette, Corona Del Mar, Calif., assignor to Scientific Data Systems, Inc., Santa Monica, Calif., a corporation of Delaware Filed Dec. 21, 1967, Ser. No. 692,521
Int. Cl. G11b *5/44, 27/02*
U.S. Cl. 340—174.1 38 Claims

ABSTRACT OF THE DISCLOSURE

Record and reproduce skew is analyzed and digital means are suggested for correction employing counters for counting pulses having frequency considerably in excess of the recorded and reproduced character rate. The numbers to be counted may differ from digit channel to digit channel in representation of skew. The transfer of signals between record or reproduced transducers and register storage is timed in accordance with the counting. Signal peaks are digitally recognized by counting the pulses for periods during which reproduced signals exceed a threshold, half the respective count number fixes the time of peak occurrence. Bit crowding is corrected by modifying count numbers representing peak occurrence.

The present invention relates to a digital tape system, and more particularly to a magnetic tape system wherein digital data are recorded on a tape in several parallel tracks. Such digital data are conventionally provided for recording in a format which can be described as serial-by-character, parallel-by-bit. Each character has, for example, 7 or 9 bits, the latter now being preferred, and all of the bits of a character are presented concurrently for recording. Accordingly, there are 7 or 9 tracks written on the tape, and the bits of a character are distributed on these tracks across the tape.

Subsequently, when the data are to be reproduced, they must be presented in a similar format, i.e., the 7 or 9 bits of the character must be reproduced and the reproduced signals must be presented concurrently so that the several signals defining bit values can be recognized as pertaining to one character. Lack of concurrency in the presentation is generally described as skew. The effect of skew or skewing will not be detrimental as long as even in case of a somewhat sequential presentation of bit-defining, reproduced signals it can be clearly and unambiguously ascertained to which character they pertain. If, however, a signal representing a bit of a particular character appears later than a bit reproduced from a different track and pertaining to the next character, an error situation is present. In order to eliminate the effect of skew, it is mandatory to analyze the phenomena particularly because skew is actually a compound effect of several, quite unrelated causes.

The transducers for multi-track recording and for multi-track reproducing are constructed to have several transducer gaps, one for each track, and these gaps are to be aligned along an axis at an angle, for example, transverse to the direction of extension and motion of the tape. There is, however, always a certain degree of misalignment of the gaps, which often is quite irregular. For reasons of manufacturing tolerances the gaps are not arranged precisely along a particular line or axis. The misalignment of the gaps is called "gap scatter." Thus, a recording made with such a transducer will not result in a perfect alignment of the recordings on the tape for the several bits of a character when concurrently presented to the several transducers.

The reproduce transducers also exhibit gap scatter, so that bits, even if recorded in perfect alignment, will not be reproduced concurrently. In general, the gap scatter varies from multi-track transducer to transducer, and of course, gap scatter of the multi-track record transducer in a tape unit is completely unrelated to the gap scatter of the multi-track reproduce transducer of this or any other tape unit. In the general case, bits initially presented concurrently for recording by the record transducers will not be reproduced concurrently due to gap scatter of both, record transducers and reproduce transducers.

Either multi-track transducer has an axis which is a desired line along which the gaps are to be arranged, but from which they are displaced in a statistically irregular manner due to the gap scatter. As the transducers are mounted to the tape unit, another error is introduced in that the axis may not be precisely transverse to the direction in which the tape guide means will guide the tape for passage along the transducers. Gap scatter and misaligned mounting of a multi-track transducer combined is called "static skew." Static skew for reproduce and record transducers are quite independent from each other. The static skew, however, is in either case a phenomenon which affects the several characters equally throughout.

Assuming the skew consists only of static skew, then the bits of a character will not be recorded in perfect alignment but in a particular pattern of misalignment, which pattern is the same from character to character, and from tape to tape, if recorded on the same machine, and is thus a "system constant." Bits recorded in perfect alignment on a tape will be reproduced in a particular pattern of sequential presentation, i.e., there is always one particular bit the earliest, a particular one is the latest, and the others follow in between in a particular sequence, which is the same from character to character and from tape to tape. If a tape is recorded on and reproduced from always by means of the same set of record and reproduce transducers, then again the compounded static skew results in a sequential bit presentation after reproduction, and the sequence pattern is the same from character to character and from tape to tape. However, where tapes are recorded on and reproduced on different machines, the skew is still the same from character to character but differs from tape to tape.

Nonstatic phenomenon which contributes to the total skew is called "dynamic skew." One of the effects contributing to dynamic skew is the deviation of the instantaneous direction of tape propagation from the desired one. This is effective particularly as oscillation of the tape relative to the transducer axis, record or reproduce transducer, as the case may be. The dynamic skew is completely unforeseeable at any instant and is superimposed upon the static skew. This tape motion thus disturbs the "regular" misalignment pattern of the static skew of any particular transducer, and is not the same from character to character. Of course, dynamic skew is independently effective during recording and reproducing.

Skewing as a compound effect and as resulting from several causes would present no problem if the relation between the tape speed and the rate of character presentation were such that the association between the several bits as presented and the character they are to define could never be mistaken. This would, however, require a long pause in the presentation of sequential characters; nonambiguity in the presentation of reproduced bits would thus require that any bit of one character could never be aligned with a bit of the following character, and that a signal representing any reproduced bit of a character could not possibly appear later than any signal representing any bit of the succeeding character. However, if the characters were spaced apart to satisfy this requirement, the character density on the tape would be quite low, and for a given tape speed the rate of recording and reproducing would be quite slow. It is, therefore, apparent that for high character densities on a tape, an overlap may occur and that without corrective measures, reproduced bits could not properly and unambiguously be associated with particular characters.

The phenomena, as discussed thus far, involve structural features and aspects of transducers and tape. In the reproduce mode, additional phenomena are superimposed upon the tape motion irregularities and which are effective in precisely the same manner, delaying or advancing individual bit signals relative to others of the same character. These phenomena involve the reproduction of signals themselves.

Most commonly, the recording of digital signals involves the production of magnetic flux changes. The tape is magnetized in one direction before the flux change is introduced and the transducer reverses the magnetization at the time a particular bit signal is to be recorded, whereby the flux reversal is of digital significance. In the most commonly used recording format, NRZI, a digit of value "one" is recorded by causing such a flux change; a "zero" is represented by the absence of production of a flux change. Furthermore, for each character there is always at least one "one" because each character contains a redundancy or parity bit. For a perfect recording all of the flux changes representing "one" in the same character should be spatially aligned transversely to the extension of the tape, but due to the existence of record skew they are not so aligned.

During reproduction a flux change on a tape produces a voltage excursion in the transducer having one or the other polarity, depending on the direction of the flux change; sequential flux changes on the same track necessarily result in two voltage pulses of opposite polarity. If any recorded "one" is always rather far apart from the next "one" on the same track, i.e., if the characters were far apart, these reproduce pulses would have similar shapes. However, for the contemplated dense recording, closely spaced "ones" influence each others pulse shape.

If two sequential characters have a "one" in the same bit position so that two "one" follow each other directly, and if they are respectively preceded and succeeded by "zeros" (no flux change), their peaks will be farther apart than the normal bit and character spacing on the tape. Accordingly, the two signals will exhibit a time displacement analogous to a rather high frequency tape oscillation. The wave shapes of the reproduce signals are further distorted by noise resulting from incomplete erasure on the tape, tape speed irregularities, wear and tear of the tape and of the transducers, etc.

The detection of the occurrence of signal peaks is essential for the detection of the "one" bits of any character. The relative displacement of the peaks of reproduce signals is an irregular phenomenon as it depends entirely on the numerical content of the recorded data and on the "history" of the tape. This irregularity in the presentation of reproduced signals is usually not separated from the irregularities resulting from oscillatory tape motions and both types of phenomena are encountered and to be considered, and together they constitute the dynamic skew in the reproduce mode.

If a particular tape were always used in the same tape unit for recording, the skew of both transducers needs to be corrected only once, either during recording or during reproduction. If, however, a tape is to be reproduced in other tape units, record and reproduce skew must be corrected independently. The correction of static skew for recording involves provision for a sequential presentation of the bits of a charatcer to the extent that they will be recorded in near perfect alignment on the tape. The correction of skew for reproducing involves provisions for individually delaying the bits of a character so that they can be presented concurrently even though they are reproduced sequentially in parts.

Past attempts for skew correction involved the utilization of these error sources, the range of the remaining variable delay lines, which approach becomes more unreliable for higher character densities and higher character presentation rates. The invention provides for a system eliminating or reducing the skew below a tolerable level whereby in the preferred form the static skew and that part of the dynamic skew involving pulse shape distortions are eliminated. It has been found that after the elimination of these error sources, the range of the remaining dynamic skew can be made so small, simply by accurately manufacturing and designing the tape unit, that the residual dynamic skew can, in fact, be tolerated.

In accordance with the principles of the invention, skew is eliminated or, more accurately, reduced below a given tolerance, by using digital techniques. The essential element is a source for pulses having a frequency or a repetition rate which is higher by at least one order of magnitude or more than the character rate during tape-transducer interaction. A multigap transducer system with associated circuit is coupled to the tape. The transducer system is provided either for recording several tracks on the tape or for reproducing bits from several tracks on the tape. One can use the same transducer system for both recording and reproducing, but for digital devices this is rarely being done for several reasons one of them being that one usually wants to read immediately after the data has been recorded for a read after write check. In either case, there are electrical signals in the circuit network associated directly with the transducers, which signals result from reproduction or represent signals to be recorded.

Next there is provided a register or buffer for holding digital signals. These digital signals will be provided to such a register or buffer from the data processing unit to which the tape unit is coupled for purposes of recording the signals. The digital signals will be provided to this or another buffer or register for passing them to the processing unit, whereby these signals have originated in the tape reproduction unit.

The transfer of data between the register and transducer network is controlled individually for each bit in either direction; there is thus a transfer channel for each bit position in a character. Each bit transfer is controlled through a counter which counts the pulses from the source and times the transfer in accordance with a count number private to each transfer channel. The count number for the several bit channels differ in accordance with the static skew and, therefore, are preselected in accordance with the particular static skew exhibited by the particular transducer.

For recording, the transfer of the bits from the buffer to the transducer is thus delayed individually in each bit channel for providing sequential recording of the individual bits of a character, so that the recordings are aligned on the tape at an accuracy determined by the frequency of the pulses counted. For all practical purposes, any desired accuracy is obtainable here within the limits of electronic components available. For a transfer rate of $10^4$ or $10^5$ characters per second, a pulse frequency of several mc. is quite sufficient and readily obtainable. The bits will then be aligned along a particular axis, and any angular deflection of that axis relative to the normal to the direction of desired tape motion is due to the dynamic skew as it exists at the moment of recording.

For reproducing the network associated with the reproduce transducers involves additional peak recognition circuits. This circuit first determines the pulse width by first providing an analog signal of constant amplitude. Then a width (duration) is determined to be equal to the period the amplitude of the output signal of the transducer for a particular track is above a given threshold level. Reference pulses from the above-mentioned source are counted during this period. Half the count number determines retroactively the occurrence of a signal peak. If the count number does not exceed a particular value, the signal is rejected as a noise. That half-count number is incremented subsequently by additionally counting pulses up to a particular count number; thereby a fixed delay period is metered which began at the occurrence of the voltage peak of the transducer signal.

After the fixed count number has been reached, a deskew count number is counted out, again by counting high frequency pulses from the source as described. Thereafter, the bit signal is set into a stage of the register or buffer. Except for the dynamic skew and within the tolerances given by the pulses, this transfer occurs simultaneously for each bit which has bit value "one." For "zero" bits (in the NRZI format) there are no reproduce pulses, so that actually a "zero" is transferred to the register by recognizing the absence of a transfer for a "one."

The fixed delay metered for peak occurrence detection can be modified in accordance with absence or presence of a "one" in the same bit position in the preceding, and, possibly, in the succeeding character, in order to eliminate the displacement of the peak due to bit crowding, as was explained above.

The system is readily adaptable to the variable tape speed recording and/or reproducing by controlling the frequency of the clock source in accordance with the tape speed. This way, the geometric relationship between tape and transducers remains the same even though the timing of the skew correction changes.

Conventional methods for eliminating dynamic skew use two additional outer tracks with "ones" recorded at the character rate. A phase shift in the signals as read from the two additional tracks represents the dynamic skew due to tape oscillations. This method is obviously adaptable to the present system. The phase shift is expressable as a count number of the high frequency pulses. The phase shift can thus be converted into a digital number by counting, and the count result can be used to modify the deskew count number in each bit transfer channel. Using one of the additional tracks as reference, each deskew count number is incremented (positively or negatively) by a number equal to the fraction of that phase shift-count number divided by a number which is the ratio of the distance of the additional tracks from each other over the distance of the particular track, the associated count number of which has to be incremented, from the reference track.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawing in which:

FIG. 1*a* illustrates somewhat schematically the front face of a multi-track transducer together with several geometric axes for explaining static skew;

FIG. 1*b* shows schematically as block diagram a general layout of a deskewing system in accordance with the present invention;

Figure 1A:
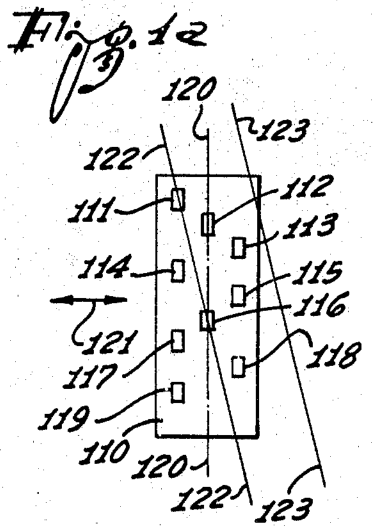

Before proceeding to the description of the preferred embodiment of the invention, reference is made briefly to FIG. 1, illustrating the phenomena involved. FIG. 1 illustrates schematically the face 110 of a transducer head with nine transducer gaps, 111 through 119. An axis 120 is the desired alignment axis for the gaps. The displacement of the gaps in the direction 121 constitutes the gap scatter, resulting in a particular displacement pattern wherein the gaps have particular, irregular distances from the axis 120. The pertinent distances are measured from respective trailing edges of the gaps, for recording and from the gap centers for reproducing. This, however, considers only geometric aspects of static skew. Additional static signal displacements result from roughness of the gap edges, angle of attack of the tape, etc.

Let 122 be the normal to the desired direction of tape motion, then the angle between axis 120 and normal 122 is a misalignment angle resulting from tolerances at the time the transducer is mounted to the tape unit. The static skew is thus the deviation of the individual gaps from alignment with axis 122. Dynamic skew includes and is effective as oscillations of the axis 122 during the tape motion about a position of axis 122 when the tape is at rest.

Static skew can be corrected by choosing a reference axis, such as 123, running parallel to the axis 122 for a position when the tape is at rest. Each bit signal is then delayed for a period at least approximately equal to the ratio of the distance of the transducer gap from axis 123 over the value of tape speed.

Figure 1B:
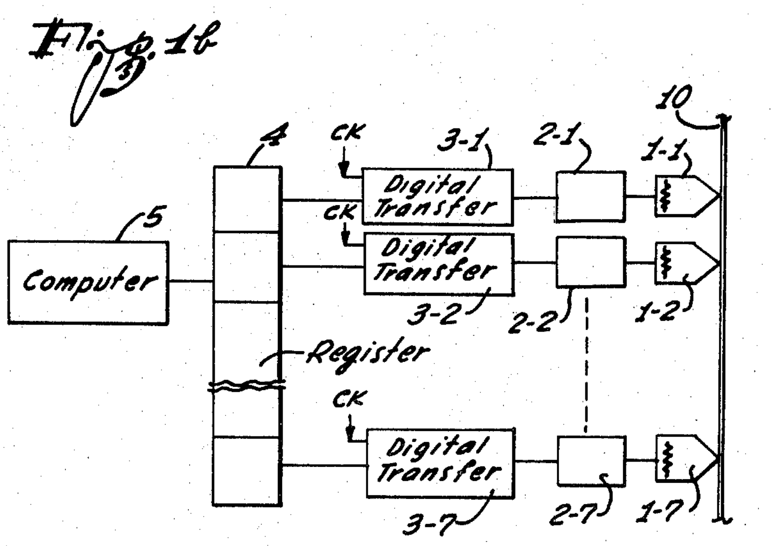

Proceeding now to FIG. 1*b*, there is shown a tape 10 for multi-track recording and reproducing. Several transducers such as 1–1, 1–2 . . . 1–9 are coupled to the tape for recording thereon and/or reproducing therefrom digital signals. The blocks 2–1, 2–2 . . . 2–9 refer to circuit networks for the development or reception of suitable electrical signals, representing digital data to be recorded or data which have been reproduced. Each block 2–1, 2–2, etc., pertains to a transfer channel for the bits in a particular bit position of a character, there being as many transfer channels as are bits in a character, for example, nine.

Each transfer channel includes a digital transfer unit such as 3–1, 3–2 . . . 3–9 for providing, among other features, digitally controlled delays of the transfer of signals from or to the respective signal unit 2–1, 2–2, etc., to or from a register 4 which receives data from a computer 5 or delivers them thereto. The digital transfer unit in each channel operates essentially as pulse couter, counting a particular number of pulses CK for metering a particular delay for the signal transfer, which delay is uniquely related to the channel. The transfer unit may perform additional operations on a digital, counting basis as will be developed more fully below.

Figure 2:
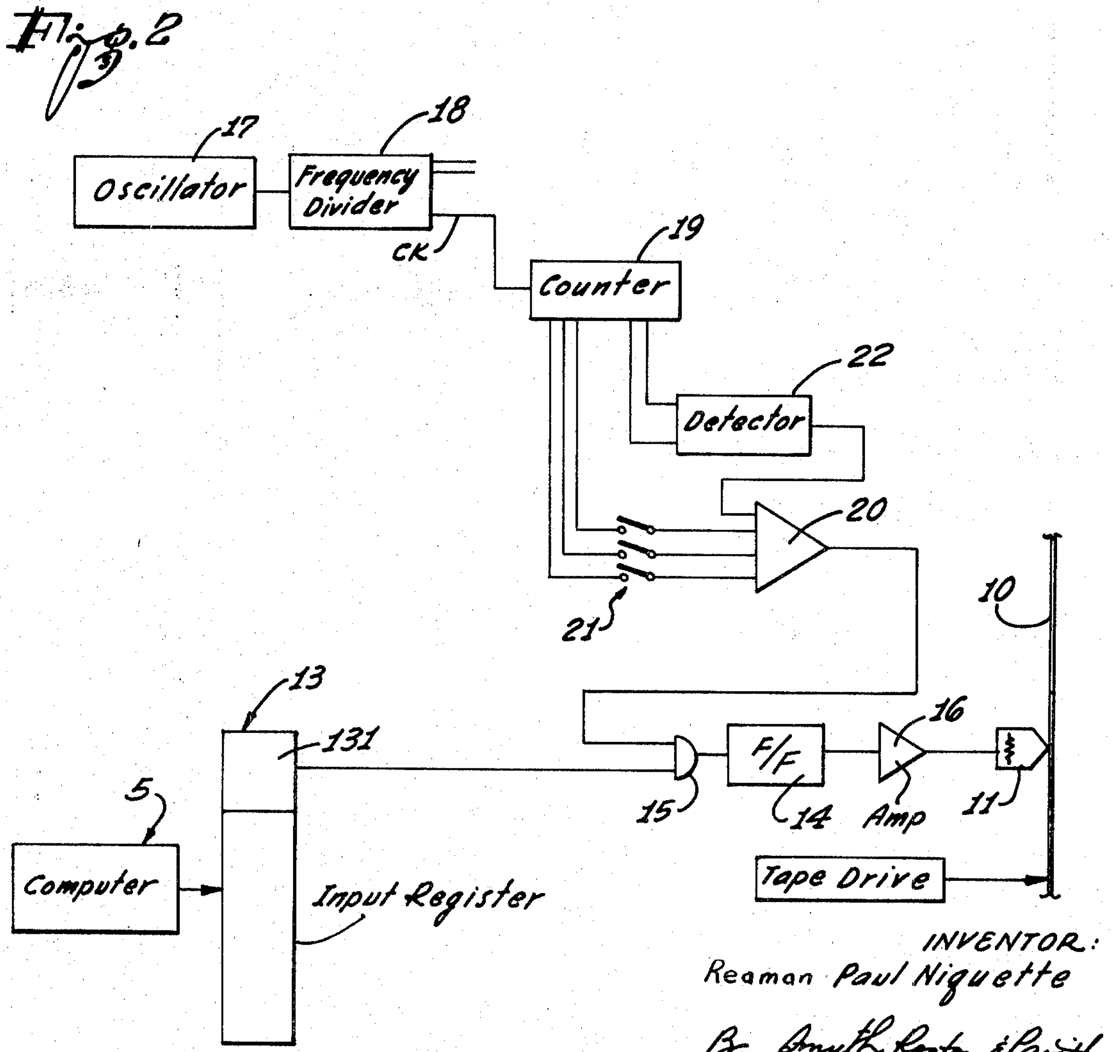
FIG. 2 illustrates a block diagram of a record-deskew system in accordance with the preferred embodiment of the invention.

Proceeding now to the description of FIG. 2, in which there is illustrated a block diagram for a record system with deskew. Digital data are to be recorded on a tape 10. The data have a format in which a plurality of, for example, nine bits form a character. The nine bits are to be recorded in alignment across the tape, resulting in nine tracks for the several bits of progressively recorded characters. Only one of the transducers for recording is shown, designated by reference number 11. This transducer may include, for example, one of the transducer gaps such as transducer gap 111, as shown in FIG. 1. The data to be recorded by the transducer 11 and by the eight others operating in parallel with transducer 11, are developed in a digital transfer channel as follows.

The character to be recorded is received, for example, from the computer 5 by a register buffer 13, having nine stages, only one thereof, stage 131, is illustrated distinctively. The buffer 13 corresponds to register 4 in this specific embodiment. The stage 131 may be flip-flop which is placed into the set state for a binary "one" and in the reset state for a binary "zero." Since the NRZI recording method is to be used, stage 131 controls a toggle flip-flop 14 through a gate 15 causing the state of flip-flop 14 to change whenever stage 131 is placed into or maintained in the set state each time gate 15 opens. Thus, flip-flop 14 changes its state for each "one" and remains in whatever state it is in for each "zero." The transfer rate is controlled by gate 15.

The output of flip-flop 14 is amplified in an amplifying network 16 providing current in one direction into transducer 11 as long as flip-flop 14 is and remains in one particular state; the current flows in the opposite direction when flip-flop 14 is in the other one of its two state. Thus, whenever flip-flop 14 changes its state, the current in the transducer 11 reverses and produces a change in the direction of magnetization as imparted upon the tape by transducer 11.

As long as flip-flop 14 maintains either one of its states, the tape is continued to be magnetized in one or the other direction without change. Of critical importance is now the timing of triggering a change of state in flip-flop 14 and more particularly, the timing of the production of a flux reversal in the tape.

Without gate 15, any change in the state of flip-flop 14 would occur whenever a "one" bit is set into stage 131 from the computer 5. The transfer of the bits of a character into register 13 occurs, of course, concurrently for all of its stages. Without gate 15 the magnetic transitions or flux reversals for the several "one" bits of such a character would appear in a pattern on the tape 10 analogous to the gap scatter pattern shown in FIG. 1*a*. Proper timing of the transfer of signals from the buffer 13 to the toggle flip-flops, including flip-flop 14, selectively defers the change of state of each toggle flip-flop, if such change is called for.

The write or record deskew system includes an oscillator 17 feeding high frequency signals to a selective frequency modifier 18 to provide suitable output pulses at different frequencies for different tape speeds. The particular output pulses used here are denoted with reference character CK. The pulses CK are fed to a write deskew counter 19 which is a recycling counter, counting, for example, thirty-two of these pulses CK during each counting cycle.

Counter 19 operates continuously and its recycle rate is exactly equal to $1/32$ of the frequency of pulses CK. This is to be the rate which determines the character spacing on the tape for the chosen tape speed. Of course, it is also the rate with which sequential bits are to be recorded on any particular track. Counter 19 and frequency divider 18 are common to all bit channels. The elements 17 and 18 may actually pertain to the computer 5 as system clock thereof.

The counter 19 will preferably be a binary counter having five cascaded toggle flip-flops. The three low order bits of the count number is counter 19 are applied to respectively three inputs of a control gate 20 through adjustable, skew adjusting switches 21. A "true" signal will be applied for a digital "one" in either of the three stages respectively through a closed switch, and for a digital "zero" from the counter at an open switch position, as schematically illustrated. Actually, the switches 21 connect selectively set or reset output sides of the three low order counter flip-flops to gate 20. Coincidence in the three inputs will occur in accordance with the adjustment of the switches 21 and for one particular number only within the eight numbers definable by the three low order bit positions of counter 19. The particular number recurs at the rate of change of the next higher bit (4th significant bit) in counter 19, which is four times the counter cycle rate. Switches 21 pertain to one data bit channel so that there are correspondingly eight other such switches, and there are also eight gates comparable with gate 20.

A detector 22 responds to a state in counter 19 when the two high order bits thereof each have the value "one." This covers count numbers 24 to 31 and blends out the last quarter of each cycle period of the counter. The output of detector 22 is an enabling signal lasting for the duration of that quarter-counter cycle period and is passed to the coincidence network or gate 20 as the fourth input thereof.

It will be recalled that the recycle period of counter 19 determines the bit or character rate for the recording process. The last quarter of each counter cycle defines the logical frame time within which bits can be gated for recording. Detector 22 is common to all digit channels to define a common character frame time for each of them. The particular timing for recording bits of the particular channel within the logical frame time is individually determined therein by the number adjusted for any bit channel by the selector switches therein, here switches 21.

The output of detector 22 is a write enabling signal, and the output pulse of gate 20 is a write command pulse occurring at one particular count number for counter 19, and at a repetition rate in accordance with the counter recycle rate or $1/32$ of the frequency of pulses CK. The repetition rate is, of course, equal for all bit channels, but the phase of each write command pulse in the several bit channels may differ from channel to channel and in accordance with the adjustment for the several selector switches, which in turn has been made in accordance with the static skew pattern of the particular record transducer assembly.

It is repeated here that the output pulses of gate 20 serve as gating signals for gate 15 to transfer a particular state of stage 131 of input register 13 to the flip-flop 14. For each bit if value "one" held in stage 131, the write command pulse triggers a change of state in flip-flop 14 to produce a magnetic transition or flux reversal in the particular track on tape 10. This occurs essentially with the production of the write command pulse for the particular channel. For each binary "zero" as data signal in stage 131, the write command pulse remains ineffective, but since one usually operates with odd parity, always one write command pulse in one of the channels will be effective within the frame time determined by detector 22 for all channels.

It follows from the foregoing that static skew is essentially eliminated in the recordings of value "one" bits, at a resolution determined by the pulses CK. The several magnetic transitions pertaining to a character are aligned along a character frame axis on the tape and at an accuracy equal to about half the frequency of the pulses CK times the speed of tape, which value measures the maximum distance any transition may have from the character frame axis as produced. In the absence of dynamic skew, that would be the axis 123 of FIG. 1*a*. The actual character frame axis may, however, have an angle in relation to axis 123 due to the dynamic skew, which angle varies from character to character. The restriction of recording to within a period of one-fourth the character recording rate amply prevents any incidental transverse alignment of magnetic transitions pertaining to two successive characters, as long as dynamic skew is limited to three-fourths of the character period.

The magnetic state on and along a track on tape 10 may representatively appear as shown in FIG. 4*a*. $+\emptyset$ and $-\emptyset$ respectively denote the state of magnetization along a track, for example, saturation magnetization in the direction of tape movement and oppositely thereto. Each transition denotes a "one," absence of a transition at the times $T_{20}$ of a write command pulse denotes a "zero."

Figure 3:
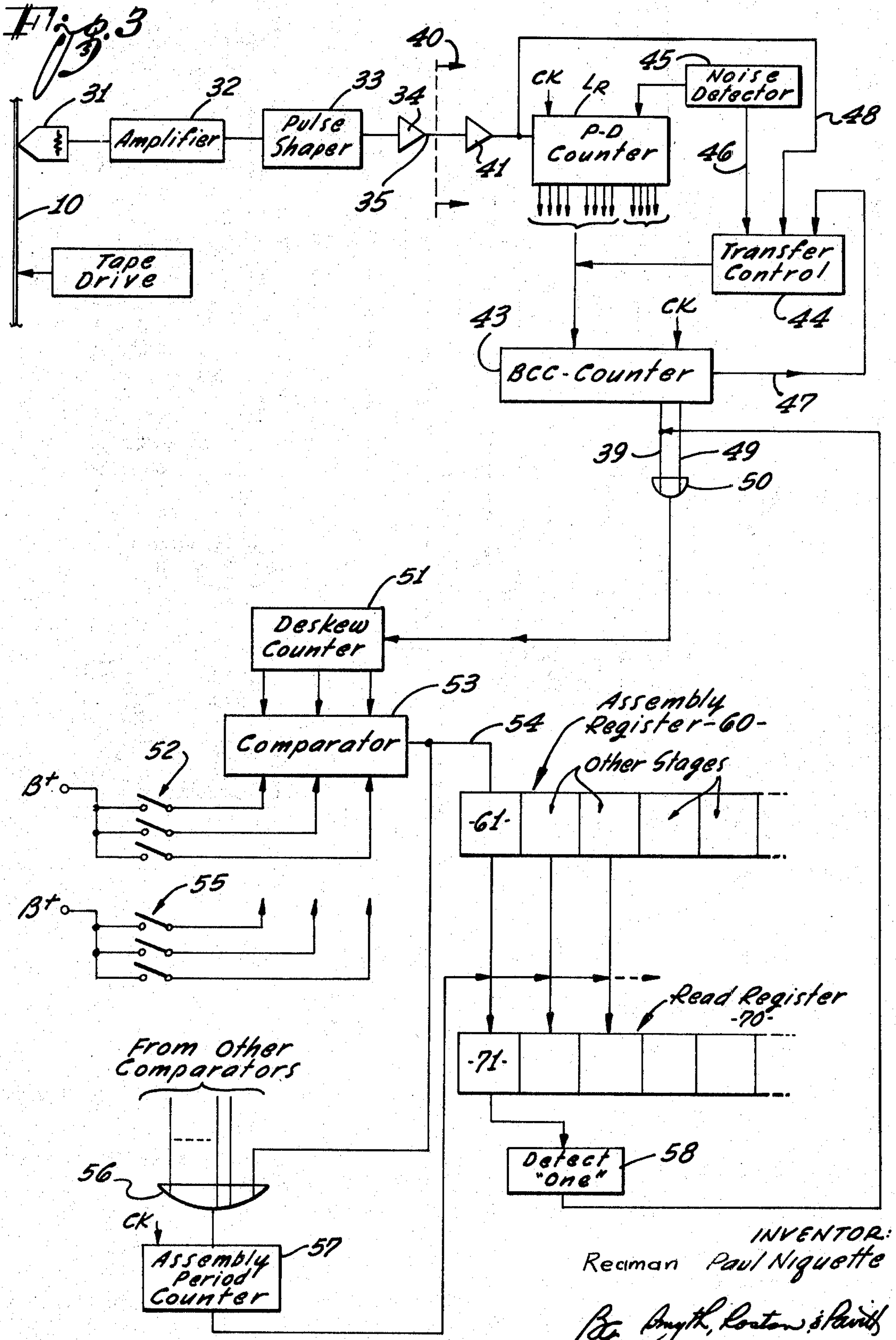
FIG. 3 illustrates a block diagram of a reproduce-deskew system in accordance with the preferred embodiment of the invention.

Proceeding now to the description of the reproduce system in FIG. 3. There is shown again the tape 10, having a plurality of tracks such as nine tracks in which have been recorded respectively the nine bits of sequentially provided characters and in a parallel-by-bit, serial-by-character format. An individual track is monitored by a transducer 31 including, for example, one of the transducer gaps as shown in FIG. 1*a*, should the transducer in FIG. 1*a* be interpreted as a reproduce transducer. Assuming that transducer 31 reads a track with recordings as shown in FIG. 4*a*, then the output signal of the transducer will be as depicted in FIG. 4*b* and in vertical alignment with FIG. 4*a*. The output signal of transducer 31 is fed to a read amplifier-rectifier 32 to provide the signal at a more suitable level. The corresponding output of the amplifier-rectifier 32 is shown as a pulsating D-C signal train in FIG. 4*c*, also in vertical alignment with FIGS. 4*a* and 4*b*.

The curve in FIG. 4*c* shows voltage peaks 32′ respectively corresponding to the magnetic transitions on the tape. The rectifier 32 feeds its output to a squaring circuit 33, such as a Schmitt trigger, which provides rectangularly shaped pulses 33′ for each bit having value "one" as shown in FIG. 4*d*. In particular, whenever the output of amplifier-rectifier 32 exceeds the level marked "threshold" in FIG. 4*c*, Schmitt trigger 33 shifts to the upper level and reverts back to the normal or lower level when the output signal of amplifier 32 drops below the threshold level.

The threshold level of response of Schmitt trigger 33 is selected in accordance with sensitivity requirements of the system, on the one hand, and in accordance with noise rejection capabilities required for the system on the other hand. However, it will be explained shortly that not all noise has to be rejected at that stage so that the threshold level can be quite low. On the other hand, and looking here at the right-hand portion of FIGS. 4*c* and 4*d*, the threshold level must be high enough so that the output pulses of the squaring circuit 33 are sufficiently far apart with a definite pause in between.

The output of this squaring circuit 33 feeds a line driver 34 to feed a signal to a control station 40 which is common to several tape units, as only one tape unit at a time will be used. Line 35 symbolically denotes this connection. Corresponding line drivers for bit signals of the same bit position but pertaining to other tape units may feed corresponding signals into line 35 at different operating times. The output signal of this particular line driver 34 when connected to input channel 35 of the control unit 40 is received by a receiver 41, there being eight corresponding receivers for the other bits in control station 40. The output signal of receiver 41 is again a square shaped signal for each bit of value "one," i.e., for each pulse 33′. For zero bits, no signal or merely the reference voltage level corresponding to the below threshold response level of the Schmitt trigger is received.

A pulse 33′ enables a pulse duration counter 42, in the following also called PD counter 42, to count clock pulses CK. It should be noted that these pulses CK can, but do not have to, originate in the same manner as the pulses CK referred to above with reference to FIG. 2, nor do they have to have the same frequency, which may well be the case if the tape speed differs during recording and during reproducing. Also, it is conceivable that record and reproduce deskewing, pulse analysis, etc., is carried out at different resolutions. Presently it is assumed that all these various pulses to be counted have the same pulse rate and the same origin, but this is merely a matter of convenience and simplification and not of necessity.

Considering the pulses CK now, from the standpoint of signal reproduction, the frequency rate of the pulses CK will be 32 times the expected character rate, so that sequential bits on the particular track of the tape are, on the average, 32 clock pulses CK apart. More particularly, there will be 32 pulses CK, at least approximately, from midpoint to midpoint of two succeeding pulses 33′ should two succeeding bits on the track have a value "one."

PD counter 42 thus counts pulses CK for a period equal to the pulse 33′, which is the period for which the output of transducer 31 exceeds the threshold level (FIG. 4*c*) which level has no immediate digital significance and is basically arbitrary. At the end of each pulse 33′ a particular count result is obtained in counter 42. For bits of value "zero," no count result is obtained, i.e., the counter remains at count state zero. The particular count number reached has no immediate digital significance; merely the presence of a count number other than zero represents the detection of a bit of value "one" by counter 42. It is advisable to provide counter 42 with sufficient stages, as some readout pulses may be quite broad. For example, accommodation of two character periods (or 64 pulses CK) amply suffices to have sufficient "counting space" available.

The count number obtained in counter 42 is transferred to a bit crowding correction counter 43, also called BCC counter 43, provided the following conditions are fulfilled: First of all, the BCC counter 43 must be empty, i.e., in the count state zero. Second the output of a "pulse quality check" unit 45 must be true and, of course, the transfer should be accomplished only at the falling edge of the pulse 33′, the duration of which has then been metered by counting. The coincidence of these three conditions is monitored by a transfer control unit 44.

In particular now, the quality check unit 45 determines whether the count number in counter 42 has exceeded a minimum number before such number can be recognized as identifying a "one" bit. The minimum number corresponds to a particular pulse duration, and shorter pulses are regarded as noise. This then is the second noise rejection stage permitting the setting of the threshold level for unit 33 to quite a low value for reasons of sensitivity. Strong noise peaks exceeding the threshold will still be rejected by the unit 45.

Detector 45 is enabled by or concurrently with the leading edge of each pulse 33′, i.e., when counter 42 begins to count. The unit 45 can be, for example, a multivibrator or a detector which detects a minimum count state for counter 42. From the time of occurrence of a leading edge of the pulse 33′ up to the counting of the minimum count number, the detector 45 provides a "false" or disabling signal into its output channel 46; thereafter, unit 45 provides a true signal. Should the falling edge of a bit "one" signal 33′ occur while the output of detector 45 is still false, a reset signal is also provided for the PD counter 42 and the signal is not recognized as information; no transfer is possible into counter 43. On the other hand, a "true" signal in channel 46 enables the transfer control unit 44.

A test channel 47 monitors the state of counter 43 and responds, in particular, to the count state "zero" of counter 43. If, and as long as, counter 43 is in count state zero, a true signal is also produced in channel 47 and is passed to transfer control unit 44. Either true signal in channels 46 and 47, per se, cannot effect a transfer of count numbers from counter 42 to counter 43, but both signals are necessary for the transfer. The transfer is strobed by the detection of the falling edge of a signal 33; which falling edge results in a control pulse in a channel 48.

With true signals provided in channels 46 and 47, and a control pulse passing through channel 48, the count number held in counter 42 can be passed to counter 43 and counter 42 is reset. However, the transfer does not involve the entire number as counted by counter 42, but only half the value thereof for the following reasons. Since one can assume that the contour of each signal 32′ extends approximately symmetrical around its peak, one can say that a peak occurs at about midpoint of each signal 33′. That midpoint occurs in counter 42, when it has arrived at half of the number the counter will reach at the end of counting. Therefore, upon transfer of half the count number held in counter 42 to counter 43, retroactively the point in time is marked when the signal peak did occur. As counter 43 continues immediately to count pulses CK beginning from the number set into it from counter 42, counter 43 operates as if it had begun to count at the time of the peak 32′ of the transducer output. It should be mentioned that the pulses 33′ can be expected to have differing length for a variety of reasons, so that the count numbers reached during such counting differ from pulse-to-pulse (33'), i.e., from "one" bit to "one" bit.

The transfer from counter 42 is simply carried out by shifting the number. It is assumed that the counter 42 is a straightforward binary counter so that a shift by one bit position towards low order bits is the equivalent of a division by two. The lowest order digit in counter 42 is suppressed; the next digit thereof becomes the lowest order digit for the counter 43. The third significant digit in counter 42 becomes the second significant digit, etc. There is, of course, such a counter pair 42–43 for each of the nine bit channels in the system, each operating independently under exclusive control of their respective transducers.

After such a transfer, counting by counter 43 meters a progressively increasing period of time having zero point at the time of the midpoint of signal 33', i.e., of the peak of signal 32'. The occurrence of the peak is, of course, the result of the passage of a magnetic transition across the midpoint of the transducer gap and its detection is of importance for proper association of the several bits of a character. One can see here that the peak detection is an indirect process which does not use any amplitude detection or strobing. Peak detection is obtained by selecting a signal level considerably lower than the lowest meaningful peak level of the transducer output expected to occur; and by assuming quite justifiably that in about the middle of the period for which the transducer output signal has exceeded the threshold level, there occurs the peak of the signal. This aspect is utilized by transferring only half the count number from counter 42 to counter 43 and by continuing to count from that half value. Having thus fixed the peak occurrence as the zero point for continued counting in counter 43, definite delay periods can be metered commencing with the occurrence of the peak and to establish thereby the peak occurrence on a particular, progressing time scale.

It should be noted, that the principal reason for providing counters 42 and 43 as separate units is due to overlap in their operation. Counter 42 may begin to count for the next pulse 33' before counter 43 has completed the incrementing of the previous, half-count number. This overlap in turn results from selection of a rather low threshold level for Schmitt trigger 33 to accommodate a large range of possible reproduce signal amplitudes. In case the level is selected higher so that pulses 33' are rather short, counters 42 and 43 could be combined; at the end of a pulse 33' there would be a serial shift of the count number held in counter 42 corresponding to a division by two, and then the new number could be incremented again as described above with reference to counter 43 until a particular count number has been reached. It can thus be seen that counters 42 and 43 together define a counting means providing a digital representation of the occurrence of a digitally significant reproduce signal peak.

Without the improvement to be described next, counter 43 could be used to count up to a particular and fixed number and to thus establish a fixed delay period from the time of occurrence of a peak. This fixed count number could be the same for all the bit channels where a "one" has been detected (there is at least one "one" for each character). Counter 43 produces an output pulse when the selected fixed number has been reached, and this output pulse is a delayed representation of "one" bit in that particular bit channel. The output pulse of counter 43, and of the corresponding counters in the eight other bit channels represents the delayed readout bits of value "one" of a particular character. Their delayed presentation in this manner contains, however, the timing error of the reproduce skew because the count number is to be the same for all of the digit channels, at least to the extent that static skew is not being eliminated by means of that couner 43. The BCC counter 43 can, however, be used to eliminate or at least to reduce the effect of what has been described above, namely that part of the dynamic skew is not a result of tape-transducer misalignment but results from crowding. This shall be explained now briefly with reference to FIGS. 4*e* through 4*h*.

FIGS. 4*e* through 4*h* show, in four different cases, signals as they may appear at the output of amplifier 32 and for different situations. These situations depend entirely on the information content of the characters. The FIGS. 4*e* to 4*h* are drawn in vertical alignment of their respective time scales and they could be interpreted as the output pulses of four transducers with perfectly aligned gaps respectively reading four tracks. The character under consideration has a "one" bit in each of the four bit positions and the respective four magnetic transitions are assumed to be in perfect alignment on the tape along a line parallel to the axis of the transducer gaps.

FIG. 4*e* illustrates the wave shape of a signal when in the same bit position of the preceding character and of the succeeding character, the bit values are zero. Therefore, the curve in FIG. 4*e* has a high amplitude and a rather wide base resulting in a bit pulse 33' of rather long duration. The peak of the curve shown in FIG. 4*e* occurs at a time when the magnetic transition on the tape defined as maximum magnetic field gradient passes about the center of the transducer gap.

FIG. 4*f* illustrates when the particular "one" bit in the character considered is succeeded by "one" bit in the same bit position of the succeeding character, while the preceding bit was a "zero." In this case, the curve shows two peaks which crowd each other to some extent. Thus, if two magnetic transitions follow each other on the tape rather closely, the readout signal peak of the first one which represents the "one" bit under consideration appears somewhat earlier than it would if the next bit were not a "one." Upon comparing FIGS. 4*e* and 4*f* one can notice a relative peak displacement by a period $\Delta T_1$. Moreover, the signal contour is somewhat asymmetrically distorted, so that the midpoint of the corresponding pulse 33' would appear to be displaced by $\Delta T_2$.

FIG. 4*g* illustrates the situation wherein the same bit positions of the succeeding and of the preceding character there are also "ones." Wave shape of the center peak in the resulting three peak wave is somewhat contracted as a whol, but essentially symmetrical. The corresponding bit "one" pulse 33' will be somewhat shorter, but the peak occurs at the same time it would occur also if it were neither preceded nor succeeded by "one" bits. In other words, the peaks of the curves in FIGS. 4*g* and 4*e* approximately coincide.

Finally, in the fourth case (FIG. 4*h*), the preceding character is presumed to have "one" bit in the same bit position, the succeeding bit is a "zero." The output signal curve is again somewhat distorted and the signal peak defining the "one" bit under consideration occurs somewhat later than it would occur otherwise. $\Delta T_1$ and $\Delta T_2$ represent analogous time displacements as explained with reference to FIG. 4*f*.

One can see that the situation of FIG. 4*f* represents the case where the signal peak occurs somewhat belatedly and in the situation of FIG. 4*h*, the signal peak occurs somewhat too early, only FIGS. 4*e* and 4*g* show normal and correct timing of the peaks relative to the transitions on the tape.

Figures 4, 5:
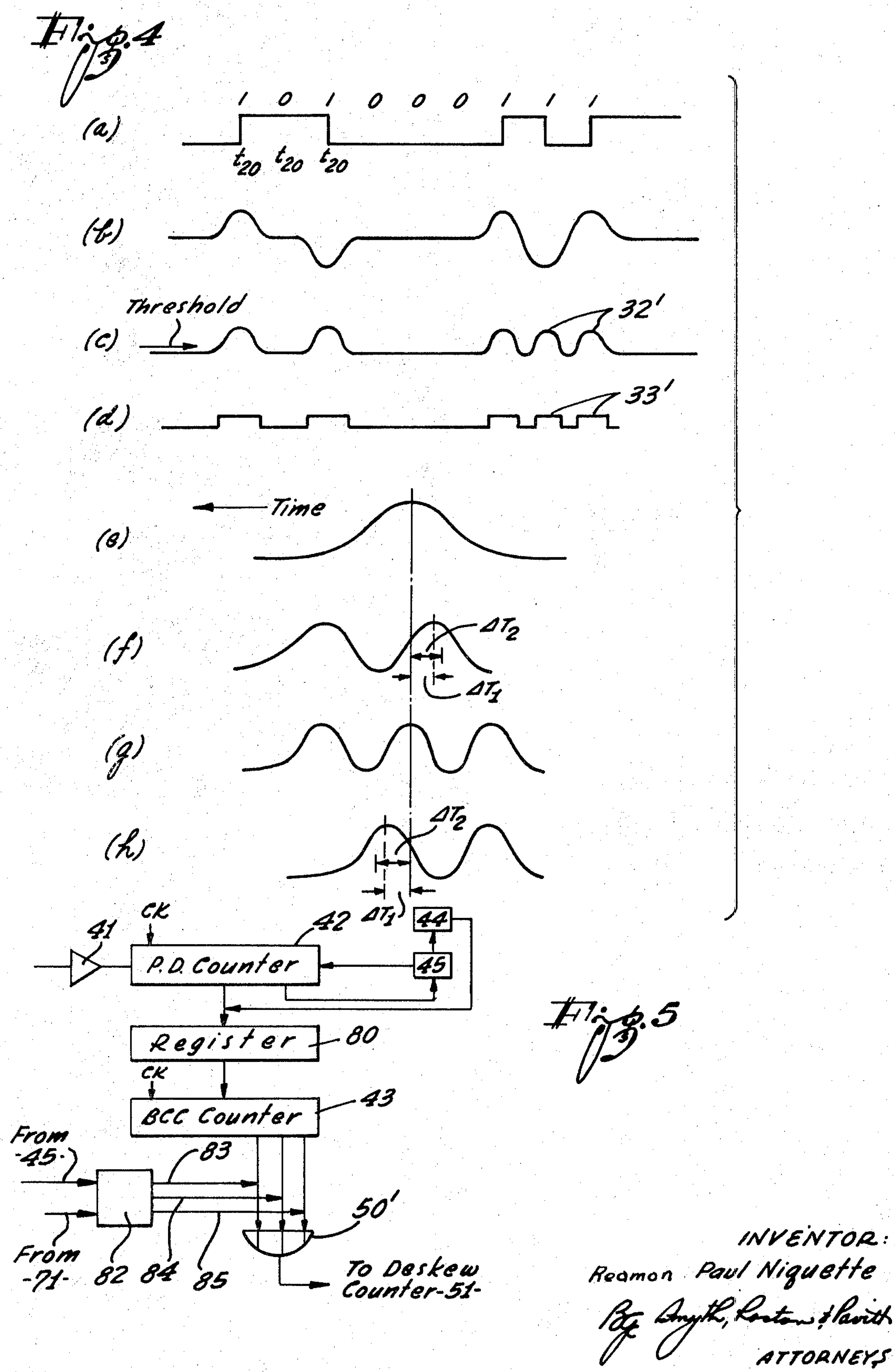
FIG. 4 illustrates several curves representing wave shapes pertinent to the system of FIG. 3.
FIG. 5 illustrates a modification of the system shown in FIG. 3.

In order to eliminate this bit crowding effect as depicted in FIGS. 4*f* and 4*h*, one could distinguish as follows, using counter 43 for metering the required delays or corrections $\pm\Delta T_2$. The particular delay (count number) up to which counter 43 counts as was explained above is used if the bit values of the respectively preceding and succeeding bits are equal. The delay is extended, i.e., a larger count number is used if only the succeeding bit is also a "one" the delay is shortened, i.e., a smaller number is used if only the preceding bit is also a "one." This distinction requires temporary storage of three characters which is expensive but shall briefly be explained in a representative example shown in FIG. 5.

It has been found, however, that a somewhat simpler method, even though not that accurate, still suffices. One needs merely to determine whether or not a "one" bit was preceded by a "one" bit. In other words, one considers only two instead of three different cases. The situation, as depicted in FIGS. 4*e* and 4*f* describe one category, and the situations of FIGS. 4*g* and 4*h* define the other category. Thus, one considers an average for the cases of FIGS. 4*e* and 4*f* and stipulates a peak time displacement having value $\pm\Delta T_2/2$ in either of the two cases, which is about a midpoint of the actual peak displacement of the peak in FIG. 4*f* alone as compared with occurrence of FIG. 4*e*. Thus, one introduces an error in the cases of FIGS. 4*e* and 4*g* and corrects half the error for the cases of FIGS. 4*g* and 4*h*. The overall result is a reduction of the error spread $2\Delta T_2$ in the uncorrected case to half that value, which was found to be of significance and, most particularly, a more accurate correction does not significantly reduce further the total effect of the dynamic skew. Thus, the expenditure for a complete bit crowding correction is only justifiable when the entire dynamic skew is to be corrected also. The simplified correction scheme as outlined, is now implemented as follows:

The BCC counter 43 has two output channels 39 and 49 respectively, one, for example, providing an output when the count number reaches "29," the other channel provides an output for count number "32." The output channel 39 for count number "29" is enabled only if the preceding bit has bit value "one." Output channel 39 is disabled when the preceding bit has value zero, and then the output channel 49 for the higher count number "32" is used. The two channels 39 and 49 are combined in an "OR" gate 50. The output signal of "OR" gate 50 represents now the occurrence of a "one" bit defining signal peak as delayed in a particular manner. The bit crowding correction is carried out individually in each bit channel, and there are eight additional "OR" gates similar to "OR" gate 50 and performing the analogous function in the other bit channels. In the absence of any gap scatter and in the absence of any true dynamic skew, the output signals of "OR" gate 50 and in the analogous output channels for the eight other bit channels will occur at approximately the same time with an error resulting from the simplification of the bit crowding correction.

Having thus reduced considerably the effect of bit crowding on the dynamic skew, static skew is eliminated as follows: It is important to note that the correction employed for the reproduce deskewing is essentially the same as for the record deskewing, except that there is no need to define character spacing. There is provide a deskew counter 51 which becomes enabled by the output signal of "OR" gate 50, so that the counter 51 begins to count pulses CK. The deskew counter 51 is a three stage counter comprised, for example, of three cascaded counter flip-flops to provide a count number in binary format. This is analogous to the three low-digit stages of record deskew counter 19. Upon shifting to count number 8, the counter 51 disables itself. There are, of course, eight other such counters, one per digit channel.

The eight different digits provided by counter 51 can be used to essentially eliminate static skew. In addition, each bit channel is associated with a selector switch arrangement, such as switches 52. The particular adjustment of switch 52 defines a number. The number expresses the effective distance of the gap of transducer 31 from the static skew axis (123 of FIG. 1) or in accordance with the relation: distance of the gap from axis 123 times frequency of pulses CK divided by tape speed. That value may be a number which is not an integer, and, of course, one will then select the closest integer.

The setting of switches 52 is applied to a comparator 53 receiving also continuously the counting signals from the deskew counter 51. When coincidence occurs, the comparator 53 produces an output pulse to be fed to its output channel 54. This output pulse represents the deskewed digit signal for a bit of value "one" in the particular channel. This "one" bit is set into the first stage 61 of a character assembly register 60. The other stages of register 60 receive bit signals, approximately concurrently but independently from each other and through similar circuit networks comparable with the elements 41 through 54 as described.

It should be mentioned at this point, that counters 43 and 51 could be combined if it were not for the bit crowding correction to be obtained in a separate process. Hence, the counters 43 and 51 together define a means for counting pulses from the time of a reproduce signal peak up to a presettable total number of counter pulses for deskewing, subject to modification of the count number for bit crowding correction.

The static skew, i.e., the effective gap scatter pattern, is to some extent dependent upon the direction of tape movement due to certain irregularities in the gap width, configuration and orientation of the gap edges, angle of attack of the tape, etc. Hence, there is provided a second set of switches 55 which can be set individually and analogously to the setting of switches 52. The outputs of switches 55 are coupled to the comparator 53 in case the tape moves backwards.

The various input channels for assembly register 60, such as 54, etc., and pertaining to the several bit channels are monitored by an "OR'd" clock 56, which is an eight input "OR" gate and determines in particular the occurrence of the first "one" in that particular character. It will be recalled that there is at least one "one" per character so that the sequence of output pulses of "OR" gate 56 defines the character rate. The output signal of "OR" gate 56 starts an assembly period counter 57, counting again the pulses CK, to meter a particular delay or waiting period in order to eliminate the effect of dynamic skew as uncorrected. It is, in effect, a constant period counter which provides for a certain tolerance before the assembly of a character in a register 60 can be regarded as being completed. If there were no dynamic skew, the character would be assembled with a period defined by two sequential pulses CK. As explained above, due to the relative oscillations of axis 123 there is uncorrected dynamic skew so that the instantaneous position of the axis relative to the tape differs from the static position thereof towards which the static skew correction is oriented. The maximum of possible angles of deflection of the transducer axis at any instant is analogous to a particular period of "spreading" in the occurrence of the input signals for register 60. That period must elapse before register 60 can be regarded as containing all of the bits of a character. Having metered the assembly period by counting a fixed number of pulses CK, the character in register 60 is regarded as assembled and transferred therefrom to a read register 70 for further processing.

The read register 70 has, of course, also nine stages which includes a stage 71. The state of stage 71 is monitored by a detector such as detector 58, there being corresponding detectors for the other stages. The detector 58 monitors whether or not a bit set into the stage 71 is a "one." The result of the detection is used to control, i.e., to enable or to inhibit the line 39 for the bit crowding correction of the next character.

The counter 57 has an additional function. The pulse from "OR" gate 56 simply starts the counter 57, which means that it continues to count until the next "OR" clock signal corresponding to the next character arrives, which should occur approximately 32 clock pulses CK later, and which resets the counter 57 to start anew. If such a character fails to appear, the counter 57 continues to count and after a particular period has elapsed, the counter 57 signals to the computer 12 the existence of a gap. This situation can be dealt with in any desirable manner. It should be noted that interrecord gaps are usually intentionally provided to separate data blocks or records from each other and to permit the tape unit to stop until the unit is needed again. After restarting the tape must reach full speed before he transducer passes over the next data block or record. Therefore, this period counted out by counter 57 can be used to trigger the tape motion stop control.

The system as described is destined to operate at a constant tape speed and in accordance with oscillations of constant frequency as provided within the clock pulse counter or clock pulse source 17. The system can readily be modified to operate for variable speed read and write operations by substituting, for example, the fixed frequency oscillator 17 by a voltage controlled oscillator, and the voltage, in turn, is developed by a tachometer connected to the capstan driving the tape, so that the output frequency of the voltage controlled oscillator is strictly proportional to tape speed. This way the constant bit and character density is maintained, but the entire evaluating system adapts itself to the variable tape speed. The various counting periods, etc., are proportionately varied in accordance with the change in frequency which in turn is representative of a change in tape speed.

Should, for reasons of an excessive dynamic skew, sequential "one" bits occur at an exceedingly fast rate, the situation may arise that the falling edge of a signal pulse 33' occurs at a time when the BCC counter 43 has not reached the required count number, so that the counter 43 is not yet empty and the transfer control unit 44 disables a transfer from counter 43. This situation is dealt with in such a manner that PD counter 42 continues to count but at a rate of 2CK and until the time the transfer control unit 44 is enabled by a true signal in channel 47 representative of the condition that BCC counter 23 is now empty and a transfer can be accomplished. As a transfer from counter 42 to counter 43 always involves only half of the value, the final result is correct, as due to the double pulse counting after the falling edge of a pulse 33' the occurrence of the center or peak of the particular pulse still remains fixed, and counter 43 still obtains retroactively a zero count period at two occurrences of the peak point. In other words, counter 42 takes over temporarily the function of counter 43 until the latter is empty.

FIG. 5 illustrates how the system shown in FIG. 3 can be extended to distinguish fully among the three situations outlined with reference to FIGS. *4e* through *4h* concerning bit crowding. Here the content of PD counter 42 is not directly transferred to BCC counter 43 but first into an intermediate register such as register 80. That transfer out of counter 42 is affected under the same conditions as were outlined above. Concurrently therewith a transfer counter (not shown) begins to count pulses CK for metering a fixed period, preferably anywhere between half and a full frame time. Thereafter the transfer is made into the BCC counter 43. It is important that this transfer counter counts up to the same number in all nine bit channels so that there is a fixed delay for each bit. After transfer into register 80, PD counter 42 may begin to count again if the succeeding bit has value "one." If not, it will not begin to count (or only for a "noise" pulse). That situation is now monitored by detector 82 which responds specifically to a true signal in line 46 indicative of a "one" bit when being detected. Detector 82 receives in addition the bit value held in stage 71 of read register 70 as outlined above. Detector 82 provides a first output in a first channel 83 if the preceding bit held in stage 71 of read register 70 is a "one" and when the bit presently detected by the transducer is a "zero" (unit 44 providing a false signal and the PD counter 42 does not count in accordance with meaningful data). The output channel 84 of detector 82 receives an enabling signal when preceding and succeeding bits are equal, either being "zeros" or being "ones." The channel 85 receives a signal when the bit held in stage 71 of read register 70 at that time is zero, but the PD counter 42 has begun to count and exceeded the response level for unit 44 so that, in fact, there is another one bit now succeeding one bit following. The three channels 83, 84 and 85 respectively affect three different output channels of the BCC counter 43 in order to fully compensate the change in peak detection time due to the bit crowding occurring for one or the other reasons, explained above with reference to FIGS. *4e* to *4h*.

The invention is not limited to the embodiments described above, but all changes and modifications thereof not constituting departures from the spirit and scope of the invention are intended to be covered by the following claims.

What is claimed is:

1. A system for deskewing digital data when reproduced from multiple track recordings on a movable storage carrier comprising:

a plurality of transducers coupled to the storage carrier for reproducing the digital data recorded on the tape and providing a plurality of signal trains corresponding to the number of tracks, the signals in each train having individually digital significance;

first means connected to the transducers to be responsive to the signal trains for providing a representation of the occurrence of each individually significant signal in each of the trains;

second means connected to the first means and responsive to said representations for providing a digital representation representing a delayed occurrence for each digitally significant signal in each of said trains; and third means for providing signals representing a particular number in representation of the delay for said delayed occurrence for each of said trains, and coupling these signals to the second means for controlling the delay of the providing of said digital representation in accordance with the number represented by the signals.

2. A system for deskewing digital data reproduced from multiple track recordings on a movable storage carrier, comprising:

a plurality of transducers coupled to the storage carrier for reproducing the digital data recorded on the storage carrier and providing a plurality of signal trains corresponding to the number of tracks, the signals in each train having individually digital significance;

a plurality of first means respectively connected to the transducers to be respectively responsive to the signals in the signal trains for providing a representation of the occurrence of each digitally particularly significant signal in each of the trains;

a source of reference signals providing reference signals at a frequency substantially in excess of the repetition rate of digitally significant signals in either of said trains;

a plurality of counters connected respectively to the plurality of first means each for counting said reference pulses up to a particular number, individually predeterminable for each counter, and each counter providing a signal when the respective, particular number has been reached; and means responsive to said signals as provided by the counters to derive therefrom composite digital information.

3. A system for reproducing digital data recorded on a storage medium in a plurality of tracks, comprising:

transducer means coupled to the tracks on the storage medium for providing a plurality of signals respectively as a reproduction of the data of the tracks upon movement of the storage medium past the transducer means, there being one train of signals for each track;

means coupled to the storage medium for providing movement to the storage medium;

means for providing reference signals at a rate substantially in excess of the rate of data as reproduced by the transducer means;

means connected to the transducer means and to the means for providing reference signals, for counting the reference signals in response to a particular characteristic of the reproduced signals and individually for each train of reproduced signals and producing signals in representation of the results of counting;

means connected to be responsive to the signals for digitally processing the signals, individually for each train of reproduced signals, for obtaining a first signal for each train, the occurrence of which having particular timing significance of digital data as recorded and as reproduced in the particularly associated track; and a plurality of means, connected respectively to be responsive to the first signals and further connected to be responsive to the reference signals for counting predetermined numbers of reference signals from respective occurrence of the first signals for obtaining essentially concurring second signals having particular digital significance in accordance with and in representation of the recorded data.

4. A deskewing system for recording bits defining a character essentially in alignment along a particular axis on a movable storage carrier, there being a plurality of transducers for respectively recording the bits of a character when the carrier is moved past the transducers, there being further a register having a plurality of stages for respectively storing the bits of a character about to be recorded, comprising:

first means for respectively feeding the bits from the stages of the register to the transducers;

a plurality of counters for counting predetermined numbers and operating cyclically and in phase;

a source for reference signals coupled to the counters for obtaining the countings in the counters; and second means respectively coupling the counters to the first means for obtaining the feeding in timed response of occurrence of the respective numbers in the counters.

5. A digital reproducing system comprising:

a plurality of parallel information signals recorded on a moving medium;

means for continuous parallel sensing of said digital information on the moving medium;

a plurality of transfer means for presenting said sensed parallel digital signals to a register means;

each of said transfer means adapted to delay its associated signal a time period $\Delta t_D$ as measured by a digital pulse counting means before presentation to said register means, said $\Delta t_D$ period for each transfer means having a duration measured by a number of counted constant frequency digital pulses having a relatively short period compared to the period of the digital information on the moving means;

digital pulse generating means;

each transfer means having a plurality of control means for adjusting period $\Delta t_D$ including a first control means; and said first control means including means for commencing $\Delta t_D$ at a time determined by substantially one-half the number of continuous equal period digital pulses counted by a counting means during the time a sensed digital information signal remains above a preset threshold.

6. A digital reproducing system comprising:

a plurality of digital information signals recorded on a moving medium;

means for continuous sensing of said digital information on the moving medium;

transfer means for transferring said sensed digital signals to a register means;

digital pulse generating means the generated pulses being independent from the digital information as recorded on the moving medium;

digital pulse counting means connected to the pulse generating means for counting the generated pulses; and means included in each transfer means for commencing transfer of said sensed signals at a time determined by substantially one-half the number of continuous equal period digital pulses counted by a counting means during the time a sensed digital information signal remains above a preset threshold determined by a threshold means.

7. The system as claimed in claim 6 including a plurality of parallel digital information signals and a plurality of parallel sensing and transferring means.

8. A skew correction systems for multiple track tape units, there being a corresponding plurality of transducers coupled to the tape at the respective tracks thereon, a plurality of circuit means respectively connected to the transducers of the plurality holding electrical signals as significant manifestations of the transducer tape interaction, there being a corresponding plurality of storage means coupled to the circuit means for holding particular signals in timed relationship to circuit means signals, the timed relation being individual for each storage means-transducer combination, the combination for providing the timing comprising:

a source reference signal having a frequency substantially higher than the fastest rate of change of digitally significant signals in the storage means;

a plurality of counters one for each storage means-transducer combination, connected to the source for counting said reference pulses; first means connected to each of the counters to provide commencement of counting on a repetitive basis; and a plurality of second means respectively connected to said counters and responsive to individual count results thereof for individually determining the timing of transfer of the signals as between the storage means and the circuit means in accordance with particular count numbers reached by the counters of the plurality, the several signals occurring essentially concurrently in the plurality of storage means.

9. A system as in claim 8, the first means operating in unison for all counters of the plurality on a recycling basis corresponding to the bit rate of transfer through the system.

10. A system as in claim 8, the first means operating in response of output signals provided by the transducers, and individually for each counter of the plurality.

11. A skew correction system for multiple track storage units there being a corresponding plurality of transducers coupled to the storage medium at the respective tracks thereon, a plurality of circuit means respectively connected to the transducers of the plurality holding electrical signals as significant manifestations of the transducer-tape interaction, there being a corresponding plurality of storage means for holding particularly corresponding signals in timed relationship to circuit means signals, the combination for providing timed transfer of the signals between the circuit means and the storage means comprising:

means for coupling each storage means of the plurality to one of the circuit means of the plurality for transfer of signals between them;

a source of reference signals having a frequency substantially higher than the fastest rate of change of significant signals in the storage means;

a plurality of counters, one for each storage means-transducer combination, connected to the source for counting said reference pulses;

a plurality of setting means respectively associated with each counter for individually predetermining particular count numbers, the count numbers being representative of the irregularities as between the several areas of interaction between transducers and storage medium; and a plurality of means respectively connected to said counters and to said setting means respectively of the pluralities for individually obtaining and determining the timing of transfer of the signals as between the storage means and the circuit means in accordance with respective coincidence between particular count number reached by the respective counter of the plurality and the predetermined particular count number as set by the respective one of the setting means, the several signals occur essentially concurrently in the plurality of storage means.

12. A system as set forth in claim 11 for the recording of data on a magnetic surface as the storage medium, as magnetic flux reversals thereon, the means of the plurality controlling the timing of the production of a flux reversal in response to said coincidence.

13. A system as set forth in claim 11, for the reproduction of data from the storage medium, the circuit means including additional counting means responsive to characteristic durations of output signals as provided by the transducer, and counting said reference signals to obtain signals in particularly timed to a significant characteristics of the transducer output signals.

14. A system as set forth in claim 13, the data being recorded as flux reversals on the storage medium, the transducers providing voltage excursions in response to the respective passage of a flux reversal, the additional counting means counting the duration of an excursion above a particular level and providing an output having a particular time-phase relationship to the occurrence of the peak of the excursion.

15. A system for reproducing digital data from multiple track recordings on a movable storage carrier, comprising:

a plurality of transducers coupled to the storage carrier for reproducing the digital data recorded on the carrier and providing a plurality of signal trains corresponding to the number of tracks, the signals in each train having individually digital significance;

a plurality of first means respectively connected to the transducers of the plurality and being responsive to the signal trains for respectively providing digital representations for the occurrence of each digitally significant signal in each of said trains;

a source of reference signals providing reference signals at a frequency substantially in excess of the repetition rate of digitally significant signals in either of said trains;

a plurality of counting means connected to respectively count particular numbers of reference signals for metering particular periods of time, the particular numbers in each counting means corresponding to the particular periods of time being predeterminable independently from each other; and a plurality of second means respectively connected to the first means of the plurality and the counting means of the plurality for providing signal representations of the occurrence of digitally significant signals for each train modified in accordance with the periods of time respectively metered by the counting means of the plurality.

16. A system as set forth in claim 15, means responsive to the respectively preceding digitally significant signal for each train for controlling the particular number in the respective counting means of the plurality.

17. A system as set forth in claim 15, each of the first means of the plurality comprising second counting means connected to be responsive to the reference signals for counting the reference signals for a period of time determined by a particular characteristics of each of the digitally significant signals in the respective trains; and means coupled to the second counting means for arithmetically processing the counting results obtained by the second counting means for obtaining the digital representations.

18. A system as set forth in claim 17, the second counting means counting the reference pulses as long as the respective signal of digital significance exceeds a particular value, the means for arithmetically processing including means for dividing each count number obtained by the second counting means by two, the first counting means being respectively coupled to the second counting means for obtaining therefrom the divided count number and for counting therefrom up to a particular number.

19. A system for reproducing composite digital data recorded on a movable storage medium in a plurality of tracks comprising:

transducer means coupled to the medium for providing a respective plurality of signal trains corresponding to the digital data as recorded on the medium in a plurality of tracks upon movement of the storage medium past the transducer means;

means coupled to the storage medium for providing movement of the storage medium;

means for providing reference signals at a rate in excess of the rate with which digitally significant data on either track passes the transducer means;

a plurality of counting means each connected to count said reference signals for a characteristic, digitally significant duration of signals in each of the plurality of said trains;

means responsive to each of said counting results reached by the counting means for arithmetically processing individually the counting results to obtain a representation of a specific instant for each signal respectively characteristic of the association between signals of a plurality of the signals to each other as representation of composite digital data.

20. A system as set forth in claim 19 comprising, in addition, a plurality of means for respectively providing representations of particular numbers;

a second plurality of counting means each connected for counting said reference signals and being responsive to said representations of specific instants for beginning of the counting in particular timed relationship to said specific instants, each counting means of the second plurality including means for providing an output when the counting means of the second plurality has counted up to the respective particular number as provided by one of the plurality of means, for timing the representation of digital data included in the reproduced signals.

21. A system as set forth in claim 19, and comprising, in addition, means responsive to the digital significance of at least two succeeding signals in each of the trains, for control of the arithmetic processing.

22. A system for reproducing digital data recorded on a storage medium comprising:

transducer means coupled to the storage medium for providing signals as a reproduction of the data upon movement of the storage medium past the transducer means;

first means coupled to the storage medium for providing movement to the storage medium;

second means for providing reference signals at a rate substantially in excess of the rate of data as reproduced by the transducer means;

third means connected to the transducer means and to the means for providing reference signals for counting the reference signals in response to a particular characteristics of the reproduction signals and producing digital signals in representation of the results of counting; and fourth means connected to be responsive to the signals for digitally processing the digital signals for obtaining a signal having digital significance in accordance with and in representation of the recorded data, and having particular timed relation to the passage of the data recordation representation past the transducer means.

23. A system as in claim 22, the signals as provided by the transducer means having particular contour the third means counting reference signals as long as the transducer signal exceeds a predetermined limit, the fourth means digitally processing the counting result to obtain the digitally significant signal a predetermined time after an amplitude extremity of the transducer signal.

24. A system as in claim 23, the fourth means additionally processing the counting result to offset peak displacement.

25. A system for reproducing digital data recorded on a movable storage medium as localized changes in a particular characteristics of the storage medium, comprising:

means coupled to the storage medium for providing movement to the storage medium;

transducer means coupled to the storage medium and being responsive to said changes upon movement of the storage medium past the transducer means and producing an electrical signal pulse in response to each change when passing the transducer means, said signal pulse having characteristics of exceeding a particular signal level for a period of time in excess of a minimum period;

means for providing reference signals at a rate substantially in excess of the rate with which said changes pass the transducer means upon said movement of the storage medium;

means coupled to the transducer means and to the reference signal providing means for counting said reference signals as long as the electrical signal pulse exceeds a particular level; and means responsive to the counting results for processing the counting results for obtaining representations of the occurrence of the passage of the change past the transducer means.

26. A system as set forth in claim 25 and including means responsive to a minimum number of counted reference signals for each electrical signal pulse and providing a distinguishing representation recognizing the electrical signal pulse as noise or as information.

27. A system for reproducing data recorded on a magnetizable storage medium as flux reversals along at least one track, comprising:

transducer means coupled to the medium for providing an electric signal excursion upon movement of the medium past the transducer means and passage of a flux reversal;

means coupled to the storage medium for providing movement to the medium;

means for providing reference signals at a rate in excess of the rate which flux reversals pass the transducer means;

counter means connected to be responsive to the duration of either of the signal excursions above a particular value, and counting the reference signals for such duration; and means connected to the counting means for digitally processing the count result obtained by the counting means for providing a particularly timed representation of the occurrence of a signal excursion.

28. A system as set forth in claim 27 comprising means connected to suppress count results in a particular range of numbers.

29. A system as set forth in claim 27 the processing means including means responsive to occurrence or nonoccurrence of one of the signal excursions in particular timed relation to another one of the signal excursions the characteristic duration of which has been counted by the counting means, for digitally controlling the timed representation of the occurrence of the latter, other signal excursion.

30. A system as set forth in claim 27 the digital processing means including second counter means for receiving half the count number and incrementing the half number by digitally counting reference signals up to a particular number, to obtain a representation of the occurrence of the peak of the signal excursion.

31. A system as set forth in claim 30, including means for modifying the particular number in accordance with the frequency of occurrence of said excursions.

32. A deskewing system for providing a uniform character assembly time for bits read from a tape progressing past a plural channel transducer, which bits are recorded on the tape in parallel tracks and in serial by character parallel by bit format and read by the transducer in like format, comprising:

a source of reference pulses providing a train of pulses at a pulse train frequency substantially higher than the character frequency when said tape progresses past said transducer;

counting means responsive to said reference pulses for counting same;

means for enabling said counting means in synchronism with the passage of digital bits past said transducer to a counting state from which to count said reference pulses;

and means for deriving from said counting means an enabling signal determining character assembly time after predetermined count values have been reached by counting reference pulses beginning with the counting state set, at least some of the count values differ for the several bits of a character.

33. A system as set forth in claim 32, the counting means including first counting means respective private to the bits read from a particular track, there being a first register for setting bit values into it when the predetermined count values have respectively been reached by the first counting means, the counting means including second counting means connected to the source for counting the reference pulses until a particular period has elapsed since setting of a particular bit into the register; and a second register for receiving signals representing all bits from the first register in response to completed counting by the second counting means.

34. A digital reproducing system comprising:

a plurality of parallel digital information signals recorded on a moving medium;

means for continuous parallel sensing of said digital signals to a register means;

each of said transfer means adapted to delay its associated signal a time period $\Delta t_D$ as measured by a digital pulse counting means before presentation to said register means, said $\Delta t_D$ period for each transfer means having a duration measured by a number of counted digital pulses having a relatively short period in comparison to the period of the digital information on the moving means;

digital pulse generating means;

each transfer means having a plurality of control means for adjusting period $\Delta t_D$ including;

first control means for determining commencement of period $\Delta t_D$;

second control means for changing period $\Delta t_D$ in response to means for sensing particular serial binary patterns in the reproduced digital signals applied to its associated transfer means;

third control means for changing period $\Delta t_D$ in response to preset parameter means; and register output means for outputting the contents of the register means at the end of a preset period $\Delta t_F$, said period commencing upon the receipt at the register means of the first signal in a parallel group of reproduced digital signals.

35. The system as claimed in claim 34 wherein said first control means includes means for commencing $\Delta t_D$ at a time determined by substantially one-half the number of continuous equal period digital pulses counted by a counting means during the time a sensed digital information signal remains above a preset threshold.

36. The system as claimed in claim 35 wherein said sensing means includes means for producing a first signal when the current digital information signal and the preceding digital information signal are binary ones, for producing a second signal when the current digital information signal and the succeeding digital information signal are binary ones and for producing a third signal under all other conditions.

37. The system as claimed in claim 36 wherein said preset parameter means includes a plurality of binary switching means representing the preset parameter value.

38. The system as claimed in claim 37 wherein said register output means includes counter means for determining period $\Delta t_F$.

References Cited

UNITED STATES PATENTS

| | | | |
|---|---|---|---|
| 2,913,707 | 11/1959 | Goldberg et al. | 340—174.1 |
| 2,937,366 | 5/1960 | Sims, Jr. | 340—174.1 |
| 3,209,268 | 9/1965 | Fraunfeder et al. | 340—174.1 |
| 3,217,183 | 11/1965 | Thompson et al. | 340—174.1 |
| 3,271,750 | 9/1966 | Padalino | 340—174.1 |
| 3,286,243 | 11/1966 | Flores | 340—174.1 |
| 3,325,794 | 6/1967 | Jenkins | 340—174.1 |
| 3,440,631 | 4/1969 | Bodmer | 340—174.1 |

BERNARD KONICK, Primary Examiner

V. P. CANNEY, Assistant Examiner